United States Patent
Tada et al.

[11] Patent Number: 5,460,040
[45] Date of Patent: Oct. 24, 1995

[54] THERMOSETTING FLOWMETER

[75] Inventors: Yasuo Tada; Katsuaki Yasui, both of Hyogo, Japan

[73] Assignee: Mitsubishi Denki Kabushiki Kaisha, Tokyo, Japan

[21] Appl. No.: 254,418

[22] Filed: Jun. 6, 1994

Related U.S. Application Data

[63] Continuation of Ser. No. 988,910, Dec. 10, 1992, abandoned.

[30] Foreign Application Priority Data

Dec. 12, 1991 [JP] Japan ................................. 3-328705

[51] Int. Cl.$^6$ ................................................ G01M 15/00
[52] U.S. Cl. ................... 73/204.25; 73/204.15; 73/204.19
[58] Field of Search .................... 73/204.15, 204.19

[56] References Cited

U.S. PATENT DOCUMENTS

| | | | |
|---|---|---|---|
| 3,363,462 | 1/1968 | Sabin | 73/204.18 X |
| 4,450,719 | 5/1984 | Nishimura et al. | 73/204 |
| 4,523,462 | 6/1985 | Kolodjski | 73/204.15 |
| 4,686,856 | 8/1987 | Vavra et al. | 73/204.15 |
| 4,907,446 | 1/1990 | Inada et al. | 73/118.2 |

FOREIGN PATENT DOCUMENTS 4241892.5  12/1992  Germany.

Primary Examiner—Richard Chilcot
Assistant Examiner—Jewel V. Artis
Attorney, Agent, or Firm—Sughrue, Mion, Zinn, Macpeak & Seas; Richard C. Turner

[57] ABSTRACT

An object of the present invention is to obtain a highly accurate thermosensitive flowmeter in which flow rate characteristic errors and temperature characteristic errors of a flow rate signal voltage are small. According to the present invention, flow rate characteristic errors and temperature characteristic errors of a thermosensitive resistor caused by trimming adjustment made on the thermosensitive resistor can be reduced by providing unvaried profile of heating area on the thermosensitive resistor. Bridge balance is adjusted so that the heat value of the thermosensitive resistor correspond with predetermined value, and gain of amplifier is adjusted so that the flow rate signal voltage correspond with predetermined value.

1 Claim, 4 Drawing Sheets

THERMOSETTING FLOWMETER

This is a continuation of application Ser. No. 07/988,910 filed Dec. 10, 1992 now abandoned.

BACKGROUND OF THE INVENTION

The invention relates to thermosensitive flowmeters that detect the flow rate of a fluid using a thermosensitive resistor.

Flowmeters that detect the flow rate of a fluid to be measured using a balanced bridge circuit having a thermosensitive resistor arranged in the fluid are disclosed in, e.g., Japanese Utility Model Unexamined Publication No. 108930/1986 and Japanese Patent Unexamined Publication No. 216214/1989.

FIG. 2 shows the configuration of a thermosensitive flowmeter. A detecting tube 2 is disposed at a predetermined position in a housing 1 that serves as a main path of a fluid. A thermosensitive resistor 3 and a fluid thermometer 4 are disposed at predetermined positions in the detecting tube 2, constituting a bridge circuit together with resistors $R_1$, $R_2$. The input terminals of a differential amplifier 101 are connected to nodes b, f of the bridge circuit, whereas the output terminal of the differential amplifier 101 is connected to the base of a transistor 102. The emitter of the transistor 102 is connected to one terminal a of the bridge circuit, and the collector of the transistor 102 is connected to a power supply 103.

FIG. 3 shows the structure supporting the thermosensitive resistor 3. The thermosensitive resistor 3 having a heating section (temperature-dependent resistor film) 31 on a surface of a plate-like insulating substrate 30 is attached to the detecting tube 2 through a supporting member 5 that supports an end of the thermosensitive resistor 3. The thermosensitive resistor 3 is connected to terminals 6 through power supplying lead wires 34, the terminals being supported by the supporting member 5 by insertion. FIG. 4 shows the detailed configuration of the thermosensitive resistor 3, in which reference numeral 31 designates the heating section (temperature-dependent resistor film); 32, an electrode section; and 33, a support section.

Since the operation of the thus configured conventional thermosensitive flowmeter is known, a detailed description thereof will be omitted. This circuit becomes balanced when the voltage at node b equals the voltage at node f. At this point in time, a current $I_H$ corresponding to the flow rate flows through the thermosensitive resistor 3. The voltage $V_0$ at node b becomes $I_H \times R_1$, and is used as a flow rate signal.

However, the voltage $V_0$, which is a flow rate signal at the time the voltages at nodes b, f are equal to each other, has errors. The errors include: dimensional and profile errors of various parts, errors of constants of the respective resistors forming the bridge circuit, and temperature distribution variations at the heating section 31 of the thermosensitive resistor 3. While it is common to give a trimming area N to the thermosensitive resistor 3 to keep the resistance thereof constant, the trimming area N is sometimes trimmed to such a profile as to be coincident with a nontrimming area M or not trimmed at all due to variations in the material or film thickness of the resistor.

If the trimming area N is trimmed so as to be coincident in profile with the nontrimming area M, a substantially uniform temperature distribution can be obtained during conduction of the heating section 31. If the trimming area N is not trimmed at all, it is apparent that a low temperature distribution is observed at the trimming area N of the heating section 31.

FIGS. 5 (a) and (b) show temperature distributions of the thermosensitive resistor 3. FIG. 5 (a) shows a case where all the trimming area N has been trimmed whereas FIG. 5 (b) shows a case where no trimming area N has been trimmed. Reference characters $h_0$ to $h_9$ indicate positions along the length of the thermosensitive resistor 3, corresponding to $h_0$ to $h_9$ in FIG. 4. For flow rate adjustment, a variable resistor $R_2$ is adjusted so that the flow rate signal voltage $V_0$ takes a predetermined value when the fluid is applied at a constant flow rate. However, when this adjustment is made on heating sections whose trimming amounts are different such as the cases (a) and (b), not only the temperature distributions but also average temperatures T become different. Therefore, a predetermined output can be obtained at an adjusted flow rate, but errors result at flow rates other than the adjusted flow rate since the flow rate characteristic of the flow rate signal voltage $V_0$ changes. In addition, the temperature characteristic also contributes to aggravating such errors.

SUMMARY OF THE INVENTION

The invention has been made to overcome the above problems. Accordingly, an object of the invention is to provide a thermosensitive flowmeter whose temperature characteristic error of the flow rate signal voltage $V_0$ is small and whose accuracy is ensured over the flow rate measuring range.

The invention is applied to a thermosensitive flowmeter in which the profile of a thermosensitive resistor is not varied to adjust resistance of thermosensitive resistor; bridge balance is adjusted so that the heat value (heat dissipation value) of the thermosensitive resistor reaches a predetermined value; and a gain adjusting means for amplifying the voltage at the node between the thermosensitive resistor and a first resistor to the predetermined output voltage is provided.

The invention eliminates variations by making the profile of a heating resistor constant. The invention also adjusts the heat value of the thermosensitive resistor to a predetermined value with the bridge circuit balanced, and adjusts the gain so that the output voltage at this time takes a predetermined value.

DETAILED DESCRIPTION OF THE PREFERRED EMBODIMENT

Figure 1:
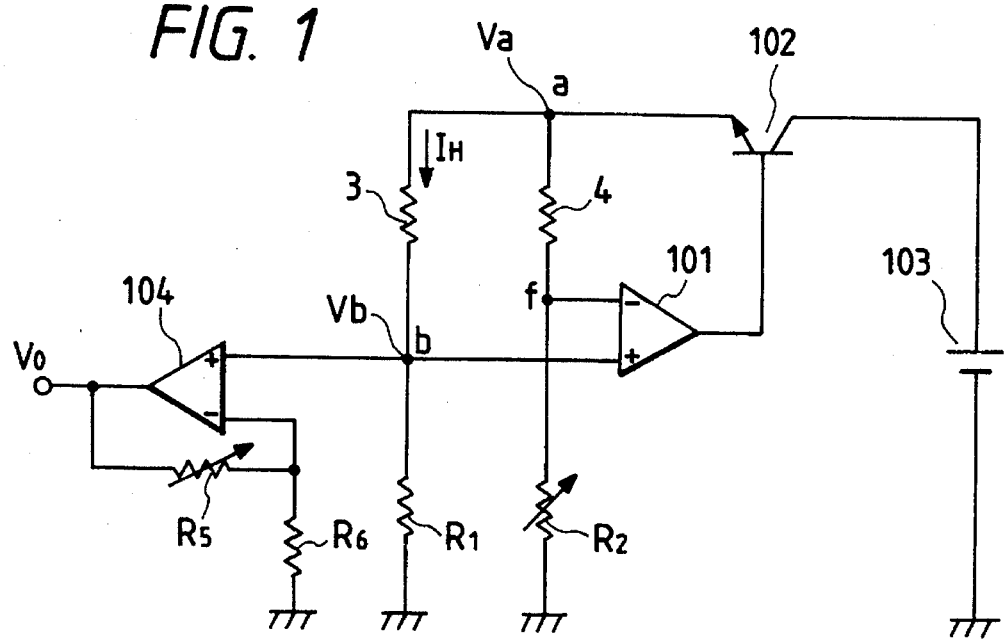
FIG. 1 is a circuit diagram showing a thermosensitive flowmeter of the invention.
Figure 2:
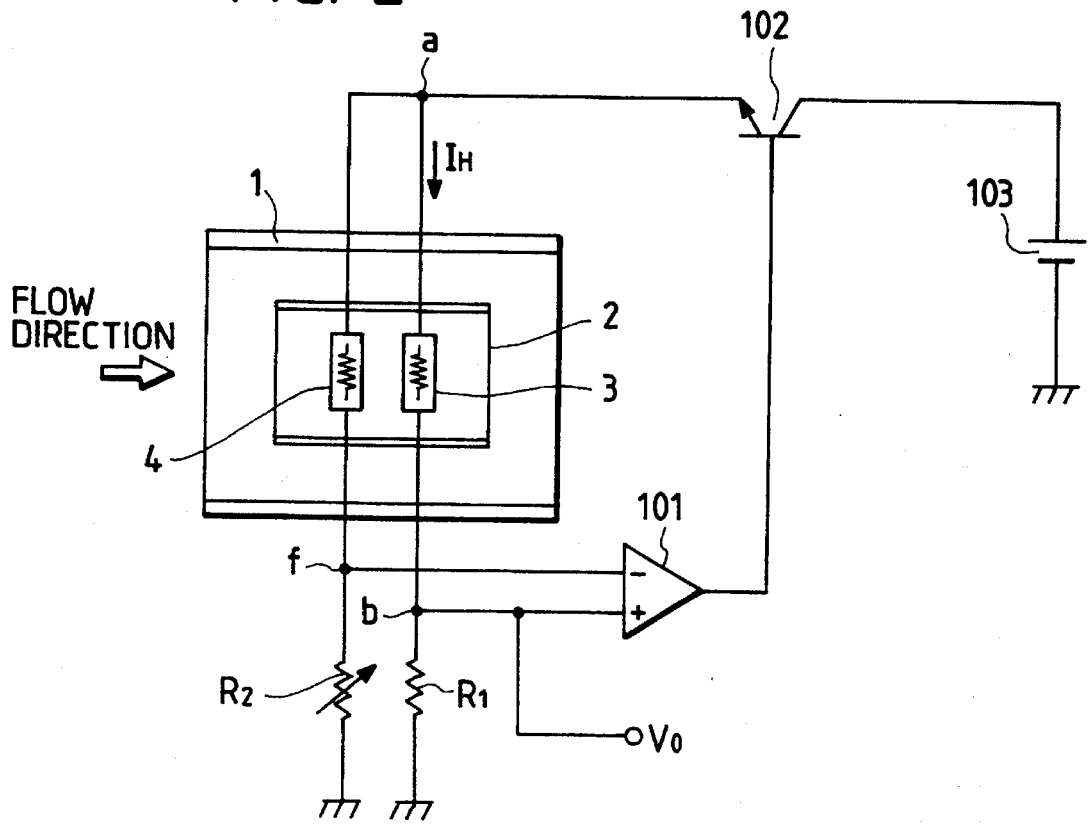
FIG. 2 is a diagram showing the configuration of a conventional thermosensitive flowmeter.
Figure 3:
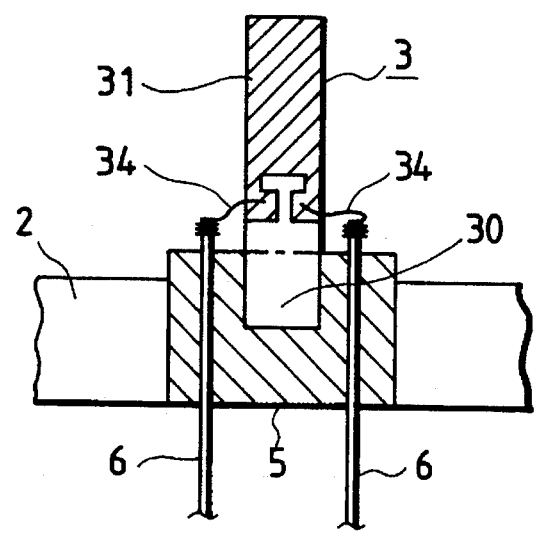
FIG. 3 is a diagrams showing the structure of supporting a thermosensitive resistor.
Figure 4:
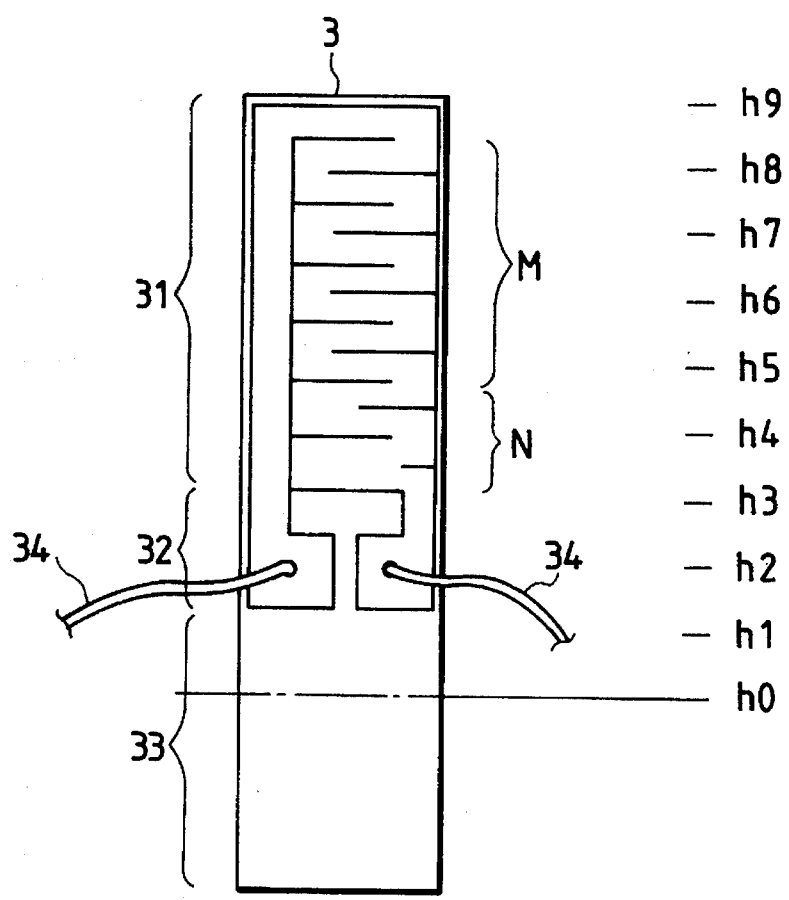
FIG. 4 is a diagram showing the configuration of a conventional thermosensitive resistor.
Figure 5A:
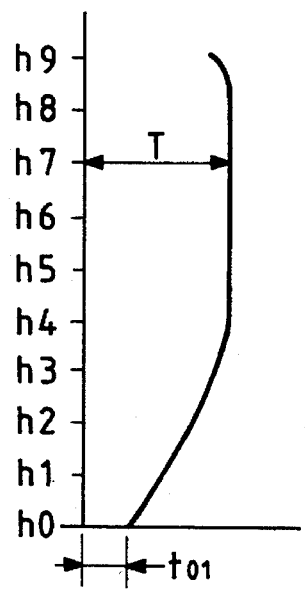
FIGS. 5 (a) and (b) are diagrams showing temperature distributions at the time the conventional thermosensitive resistor is heated, respectively.
Figure 5A:
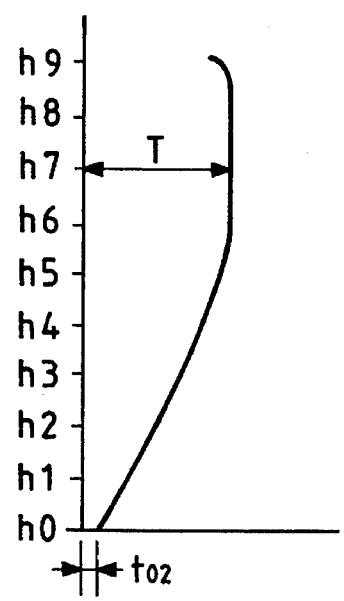
Figure 6:
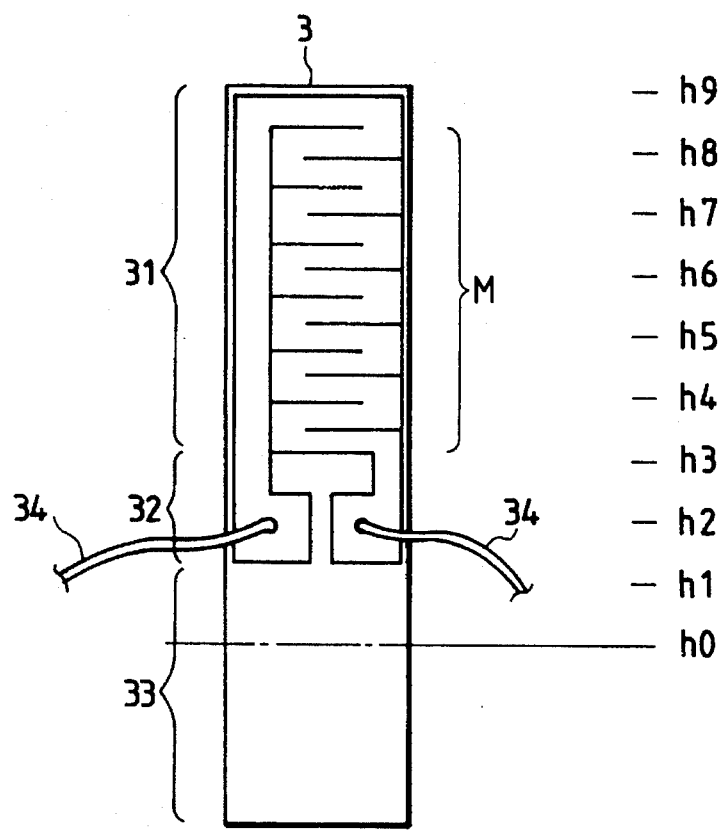
FIG. 6 is a diagram showing the configuration of the thermosensitive resistor of the invention.

An embodiment of the invention will be described with reference to the drawings. FIG. 1 is a circuit diagram showing a thermosensitive flowmeter, which is an embodiment of the invention. This thermosensitive flowmeter has a gain adjusting circuit that includes resistors $R_5$, $R_6$ and a operational amplifier 104, which is not included in the circuit shown in FIG. 2. FIG. 6 shows the configuration of a thermosensitive resistor 3, whose heating section 31 includes no trimming area.

While the flow rate measuring operation of the thus configured thermosensitive flowmeter is the same as that of the conventional example, how the flow rate signal voltage $V_0$ is set is different. That is, when the voltage at the node b equals that at the node f, variable resistor $R_2$ is adjusted so that heat value $R_3 \cdot I_H^2$ takes a predetermined value, assuming that the resistance of the thermosensitive resistor 3 is $R_3$. As is apparent from equation (1), the heat value $R_3 \cdot I_H^2$ depends on the voltage $V_a$ at node a, the voltage $V_b$ at node b, and the resistance $R_1$. Therefore, as the resistance $R_1$ is known, the heat value of the thermosensitive resistor 3 can be set to the predetermined value by measuring the voltage $V_a$, $V_b$ and adjusting the resistor $R_2$. As a result, the heat value of the thermosensitive resistor 3 can be set to a predetermined value.

$$R_3 \cdot I_H^2 = (V_a - V_b) \cdot I_H = (V_a - V_b) \cdot V_b / R_1 \quad (1)$$

Figure 7:
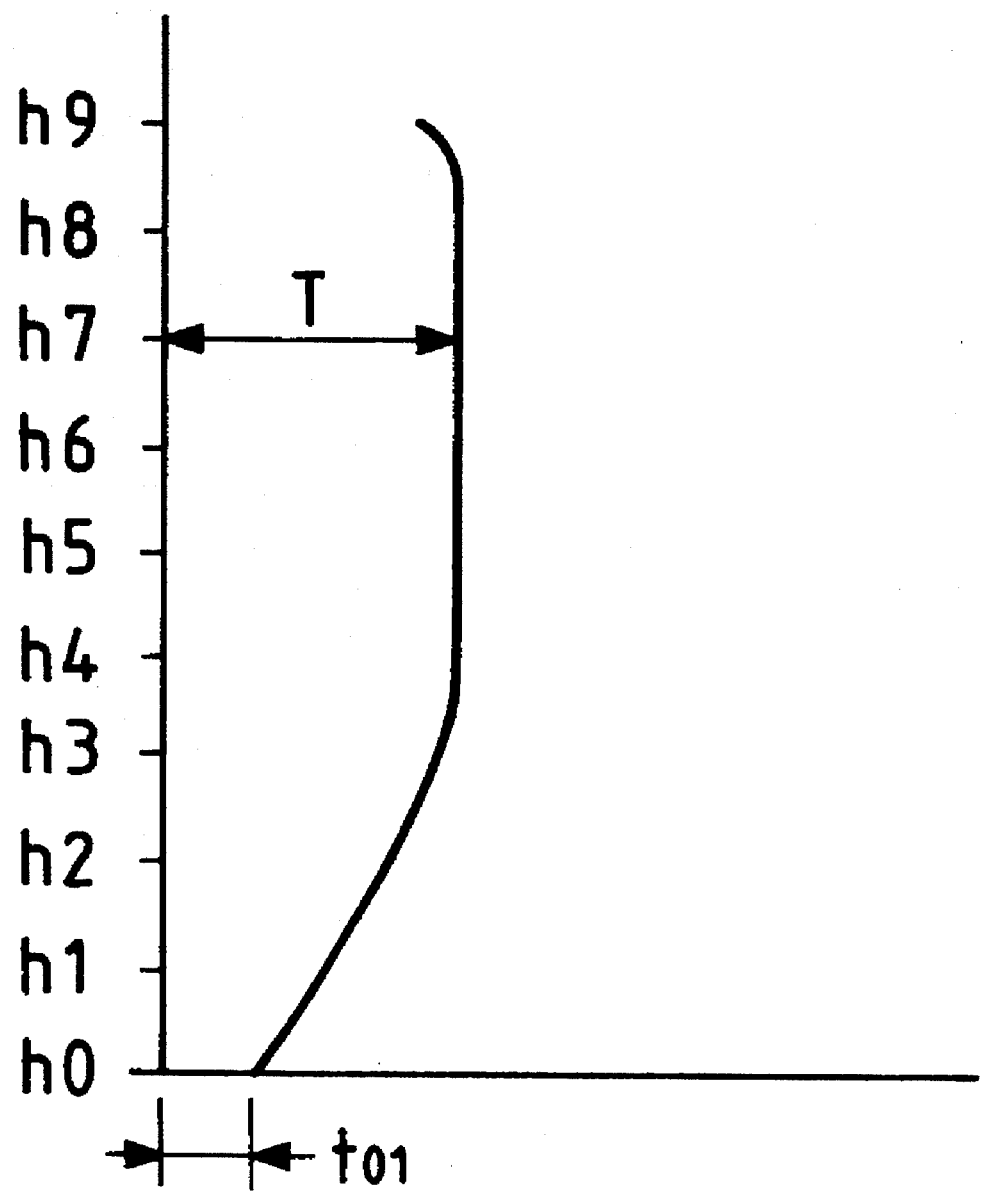
FIG. 7 is a diagram showing a temperature distribution at the time the thermosensitive resistor of the invention is heated.

While the above adjustment maintains the heat value of the thermosensitive resistor 3 at a set value, the voltage $V_b$ at node b does not take a predetermined value. To overcome this problem, it is required that the voltage $V_b$ be applied to the gain adjusting circuit that includes the operational amplifier 104 and the resistors $R_5$, $R_6$ so that the voltage $V_b$ is corrected to a predetermined flow rate signal voltage $V_0$ by gain adjustment. Such gain adjustment is effected by adjusting the variable resistor $R_5$ in accordance with the magnitude of the voltage $Vb$. Such adjustment makes the heat value of the heating section 31 of the thermosensitive resistor 3 constant even with some error in resistance of the thermosensitive resistor 3 due to the resistance thereof being nontrimmed. The absence of the trimming area N contributes to making the heating area of the heating section 31 constant, and a uniform distribution of the surface temperature of the thermosensitive resistor 3 is also obtained as shown in FIG. 7, with no change in radiation to the fluid being observed. Therefore, not only flow rate characteristic errors but also temperature characteristic errors can be reduced.

As described above, the invention makes the heating area of the thermosensitive resistor unvaried so that the bridge circuit including the thermosensitive resistor can be balanced with the heat value of the thermosensitive resistor constant. Accordingly, flow rate characteristic errors and temperature characteristic errors of the thermosensitive flowmeter can be reduced, which makes the thermosensitive flowmeter extremely accurate.

What is claimed is:

1. A thermosensitive flowmeter of the type including only non-trimmed resistive elements and whose accuracy is thus not affected by trimming of such resistive elements, comprising:

a bridge circuit including:

a first series circuit having a thermosensitive resistor arranged in a fluid to be measured and a first resistor connected in series with each other; and a second series circuit, connected in parallel with said first series circuit, having a second resistor and a third resistor connected in series with each other;

said third resistor being adjusted so that a heat dissipation value of the thermosensitive resistor reaches a predetermined value when a flow rate through said flowmeter is at a certain speed; and a gain adjusting means for amplifying the voltage at a node between the thermosensitive resistor and said first resistor to a predetermined output voltage;

wherein a current conducted through said bridge circuit heats said thermosensitive resistor so that a flow rate of said fluid to be measured is detected by an amount of radiation withdrawn from the thermosensitive resistor by said fluid.

* * * * *